United States Patent
Feng

(10) Patent No.: US 8,346,098 B2
(45) Date of Patent: Jan. 1, 2013

(54) RECEIVING APPARATUS AND RECEIVING METHOD

(75) Inventor: Zhishan Feng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 361 days.

(21) Appl. No.: 12/691,153

(22) Filed: Jan. 21, 2010

(65) Prior Publication Data
US 2010/0119240 A1 May 13, 2010

Related U.S. Application Data

(63) Continuation of application No. PCT/CN2008/071741, filed on Jul. 24, 2008.

(30) Foreign Application Priority Data

Jul. 25, 2007 (CN) .......................... 2007 1 0119496

(51) Int. Cl.
*H04B 10/00* (2006.01)
(52) U.S. Cl. .................... 398/202; 398/212; 398/214
(58) Field of Classification Search ........... 398/202–214
See application file for complete search history.

(56) References Cited

U.S. PATENT DOCUMENTS

| 4,792,993 | A | * | 12/1988 | Ma | 455/266 |
| 5,382,920 | A | * | 1/1995 | Jung | 330/308 |
| 5,389,778 | A | * | 2/1995 | Shinomiya | 250/214 R |
| 5,864,416 | A | * | 1/1999 | Williams | 398/202 |
| 6,069,731 | A | * | 5/2000 | Bayart | 359/341.41 |
| 6,118,829 | A | * | 9/2000 | North | 375/317 |
| 6,362,911 | B1 | * | 3/2002 | Lee et al. | 398/208 |
| 6,584,304 | B1 | * | 6/2003 | Thomsen et al. | 455/188.1 |
| 6,694,104 | B1 | | 2/2004 | Caplan et al. | |
| 6,724,793 | B2 | * | 4/2004 | Nagara | 372/38.02 |
| 6,826,371 | B1 | * | 11/2004 | Bauch et al. | 398/188 |
| 6,834,165 | B2 | * | 12/2004 | Feng | 398/202 |
| 6,862,322 | B1 | * | 3/2005 | Ewen et al. | 375/316 |
| 6,928,249 | B2 | * | 8/2005 | Robinson | 398/202 |

(Continued)

FOREIGN PATENT DOCUMENTS

CN 1731711 A 2/2006

(Continued)

OTHER PUBLICATIONS

1st Office Action in corresponding Chinese Application No. 200710119496.4 (Jan. 26, 2011).

(Continued)

*Primary Examiner* — Agustin Bello
(74) *Attorney, Agent, or Firm* — Leydig, Voit & Mayer, Ltd.

(57) ABSTRACT

A receiving apparatus is provided, which includes: a photo-electric detector (PD), adapted to generate current signals according to optical signals projected on the PD and digitally modulated at a high or low rate; a first switch, adapted to switch to output the high-rate or low-rate current signals; a first transimpedance amplifier (TIA), adapted to amplify the high-rate current signals into high-rate voltage signals; and a second TIA, adapted to amplify the received low-rate current signals into low-rate voltage signals. Therefore, in the present invention, high-rate and low-rate receiving paths are completely separated. This provides signals with good quality and avoids signal deterioration; and switching between the high-rate and low-rate receiving paths simplifies the structure and lowers costs.

18 Claims, 8 Drawing Sheets

U.S. PATENT DOCUMENTS

| | | | |
|---|---|---|---|
| 7,062,164 B2 * | 6/2006 | Ames et al. | 398/25 |
| 7,072,590 B2 * | 7/2006 | Robinson et al. | 398/202 |
| 7,076,177 B1 * | 7/2006 | Yang et al. | 398/208 |
| 7,092,644 B2 * | 8/2006 | Davidson | 398/202 |
| 7,099,582 B2 * | 8/2006 | Belhadj-Yahya et al. | 398/27 |
| 7,212,589 B2 * | 5/2007 | Baumgartner | 375/325 |
| 7,358,818 B2 * | 4/2008 | Uesaka et al. | 330/308 |
| 7,421,213 B2 * | 9/2008 | Harms et al. | 398/210 |
| 7,466,928 B2 * | 12/2008 | Tanaka | 398/202 |
| 7,493,053 B2 * | 2/2009 | Liu et al. | 398/209 |
| 7,620,331 B2 * | 11/2009 | Schrodinger | 398/202 |
| 7,653,312 B2 * | 1/2010 | Mori | 398/100 |
| 7,657,191 B2 * | 2/2010 | Killmeyer et al. | 398/202 |
| 7,668,469 B2 * | 2/2010 | Furudate et al. | 398/210 |
| 7,672,596 B2 * | 3/2010 | Irie | 398/155 |
| 7,792,435 B2 * | 9/2010 | Harms et al. | 398/210 |
| 7,916,385 B2 * | 3/2011 | Piehler et al. | 359/337.2 |
| 7,917,032 B2 * | 3/2011 | Mori | 398/72 |
| 7,917,043 B2 * | 3/2011 | Furudate et al. | 398/210 |
| 7,920,791 B2 * | 4/2011 | Sakai et al. | 398/66 |
| 7,920,798 B2 * | 4/2011 | Wong et al. | 398/210 |
| 7,952,430 B1 * | 5/2011 | Beffa | 330/86 |
| 8,055,139 B2 * | 11/2011 | Noya et al. | 398/210 |
| 2002/0101641 A1 * | 8/2002 | Kurchuk | 359/189 |
| 2004/0145799 A1 * | 7/2004 | Sedic | 359/325 |
| 2005/0135817 A1 * | 6/2005 | Harms et al. | 398/202 |
| 2005/0140454 A1 * | 6/2005 | Uesaka et al. | 330/308 |
| 2005/0220459 A1 * | 10/2005 | Schrodinger | 398/202 |
| 2006/0067710 A1 | 3/2006 | Liu et al. | |
| 2006/0133809 A1 * | 6/2006 | Chow et al. | 398/66 |
| 2007/0086791 A1 * | 4/2007 | Noya et al. | 398/202 |
| 2007/0160371 A1 * | 7/2007 | Irie | 398/43 |
| 2008/0050116 A1 * | 2/2008 | Nakaishi et al. | 398/43 |
| 2008/0056721 A1 * | 3/2008 | Mori | 398/100 |
| 2009/0010650 A1 * | 1/2009 | Tsuchiya et al. | 398/59 |
| 2010/0119240 A1 * | 5/2010 | Feng | 398/202 |

FOREIGN PATENT DOCUMENTS

| | | |
|---|---|---|
| CN | 2810045 Y | 8/2006 |
| JP | 2005-197881 A | 7/2005 |

OTHER PUBLICATIONS

Written Opinion of the International Searching Authority in corresponding PCT Application No. PCT/CN2008/071741 (Oct. 30, 2008).

Effenberger et al., "Dual-rate burst upstream," Mar. 2007, Huawei Technologies, Shenzhen, China.

Madureira et al., "Compensation of TIA bandwidth limitation with FIR filters," COM R1 D, Mar. 12-16, 2007, Siemens Networks, Orlando, Florida.

O'Sullivan et al., "Horizontal Integration Fabrication of a GaAs-on-InP Opto-Electronic Integrated Circuit (OEIC) Using Seeded-Mask Technology: Four Channel Variable Bandwidth Optical Receiver," WP.71, Apr. 8-11, 1991, Indium Phosphide and Related Materials, 1991., Third International Conference, Cardiff, Wales.

Suzuki, "Optically-paralleled configuration of dual-rate receiver," NTT Access Service Systems Labs., May 2007, NTT Corporation, Tokyo, Japan.

Yung et al., "Highly Integrated InP HBT Optical Receivers," IEEE Journal of Solid-State Circuits, Feb. 1999, vol. 34, No. 2, Institute of Electrical and Electronics Engineers, Piscataway, New Jersey.

* cited by examiner

RECEIVING APPARATUS AND RECEIVING METHOD

CROSS-REFERENCE TO RELATED APPLICATIONS

This application is a continuation of International Patent Application No. PCT/CN2008/071741, filed Jul. 24, 2008, which claims priority to Chinese Patent Application No. 200710119496.4, filed Jul. 25, 2007, both of which are hereby incorporated by reference in their entireties.

FIELD OF THE TECHNOLOGY

The present invention relates to the field of optical communications, and more particularly to a receiving apparatus and a receiving method.

BACKGROUND OF THE INVENTION

A passive optical network (PON) is a point to multi-point (P2MP) fiber transmission and access network, in which simple optical branching devices (OBDs) instead of node equipment are required at optical branching points. The PON may be flexibly formed into a tree, star, bus, or other types of topological structure. FIG. 1 is a topological view of a PON in the conventional art. Referring to FIG. 1, the PON includes a central office side optical line terminal (OLT) 91, subscriber side optical network units (ONUs) 92 or optical network terminals (ONTs), and an optical distribution network (ODN) 93. The ODN does not include any active electronic devices or power sources, but includes optical splitters and other passive devices, so that the management and maintenance costs are low.

In the PON system, data is transmitted from the OLT 91 to the ONUs 92 in a downlink direction by using a time division multiplex (TDM) mode, that is, downlink data is continuously transmitted, the OLT 91 continuously sends information by broadcasting to each ONU 92, and each ONU 92 selectively receives the data corresponding thereto.

Moreover, data is transmitted from the ONUs 92 to the OLT 91 in an uplink direction by using a time division multiplex address (TDMA) mode, that is, uplink data is transmitted in a burst manner, different ONUs 92 occupy different uplink time slots, and the multiple ONUs 92 share the uplink in the TDM mode. A guard time is provided between adjacent uplink time slots to prevent collision.

To avoid collision of the uplink data, ranging needs to be implemented for the uplink transmission. A loop delay of data signals in a period receives data in an uplink manner is measured, where the period is from the moment that the OLT 91 sends data in a downlink manner to the moment that the OLT 91, and a delay compensation is performed according to the loop delay, to ensure that when assigned time slots are inserted after uplink signals of the ONUs 92 are gathered at public fibers, collision between the signals is prevented and slots in a proper size are obtained.

To utilize fiber resources of an existing gigabit Ethernet passive optical network (GEPON) system, and as the future 10G EPON needs to coexist with the GEPON system, that is, to form a 10G/1G EPON system, the OLT is required to support the ONUs at the two rates of 10G and 1G.

FIG. 2 shows a solution in which the 10G EPON and 1G EPON systems coexist. In the solution, the uplink transmission is implemented with the same wavelength by using the TDM mode, and the downlink transmission is implemented with different wavelengths by using a wave division multiplex (WDM) mode. Because the uplink transmission is implemented with the same wavelength by using the TDM mode, a multi-rate receiving apparatus (MR-RX) needs to be provided at the OLT to receive the 1G and 10G ONU uplink data in a time-division manner.

FIG. 3 is a schematic structural view of a receiving apparatus in the conventional art. A receiving end of the receiving apparatus adopts a 1G/8GHz transimpedance amplifier (TIA) 80 which has a variable bandwidth for receiving, and the bandwidth of the TIA 80 is changed by switching between resistance values of feedback resistors R1 81 and R2 82. For 10G signals, the feedback resistor is switched to R2 82, the bandwidth of the TIA 80 is 8 GHZ, and the TIA 80 is adapted to receive the 10-Gbit/s signals. For 1G signals, the feedback resistor is switched to R1 81, the bandwidth of the TIA 80 is changed from 8 GHz to 1 GHz, and the TIA 80 is adapted to receive the 1-Gbit/s signals, thereby preventing the bandwidth of the TIA 80 from getting excessively large to generate too many noises and affect the receiving sensitivity of the 1G signals when the 1G signals are received.

Nevertheless, the above receiving apparatus requires a dedicated 1G/8G TIA, and the structure of the 1G/8G TIA is complicated and difficult to realize.

FIG. 4 is a schematic structural view of another receiving apparatus in the conventional art. A receiving end of the receiving apparatus shares a module of a 2.5G photoelectric detector (PD)/TIA 70, and signals are split after passing through the PD/TIA 70. In a 1G path, a passive filter (PF) 71 is adopted to filter out high frequency components, and modules of a 1G automatic gain control (AGC) 72 and a clock and data recovery (CDR) 73 are then adopted to receive the signals. In a 10G path, the 2.5-GHz PD/TIA 70 increases the attenuation of high frequency (greater than 2.5 GHz) parts of the received signals, and the signals are distorted, so that an active finite impulse response (FIR) filter 76 is required to compensate the high frequency attenuation, thereby recovering the 10G signals, and then a 10G AGC 77 and a CDR 78 are adopted to receive the signals.

Nevertheless, in the 10G path, if the active FIR filter is adopted to compensate the bandwidth limit of the 2.5-GHz TIA, the signal quality after compensation is undesirable.

SUMMARY OF THE INVENTION

The present invention is directed to a receiving apparatus and a receiving method, so as to obtain a simple structure, good stability, low costs, and desirable signal quality.

In an embodiment, the present invention provides a receiving apparatus, which includes a PD, a first switch, a first TIA, and a second TIA.

The PD is adapted to generate high-rate or low-rate current signals according to optical signals projected on the PD and digitally modulated at a high or low rate.

The first switch is connected to the PD, and adapted to switch to output the high-rate or low-rate current signals, and output the high-rate current signals to the first TIA or output the low-rate current signals to the second TIA.

The first TIA is adapted to amplify the received high-rate current signals into high-rate voltage signals.

The second TIA is adapted to amplify the received low-rate current signals into low-rate voltage signals.

In an embodiment, the present invention also provides a receiving method, which includes the following steps.

High-rate or low-rate current signals are generated according to optical signals projected and digitally modulated at a high or low rate.

The high-rate or low-rate current signals are switched to output.

The high-rate current signals are amplified into high-rate voltage signals, and the low-rate current signals are amplified into low-rate voltage signals.

Therefore, in the receiving apparatus and the receiving method of the present invention, high-rate and low-rate receiving paths are completely separated. This provides signals with good quality and avoids signal deterioration, and high-speed switching of the first switch between the high-rate and low-rate receiving paths simplifies the structure and lowers costs.

DETAILED DESCRIPTION OF THE EMBODIMENTS

The technical solutions of the present invention are described in detail below with reference to the embodiments and the accompanying drawings.

A receiving apparatus of the present invention includes a PD, adapted to generate high-rate or low-rate current signals according to optical signals projected on the PD and digitally modulated at a high or low rate; a first switch, connected to the PD, and adapted to switch to output the high-rate or low-rate current signals, and output the high-rate current signals to a first TIA or output the low-rate current signals to a second TIA; the first TIA, adapted to amplify the received high-rate current signals into high-rate voltage signals; and the second TIA, adapted to amplify the received low-rate current signals into low-rate voltage signals.

A First Embodiment of the Receiving Apparatus

Figure 1:
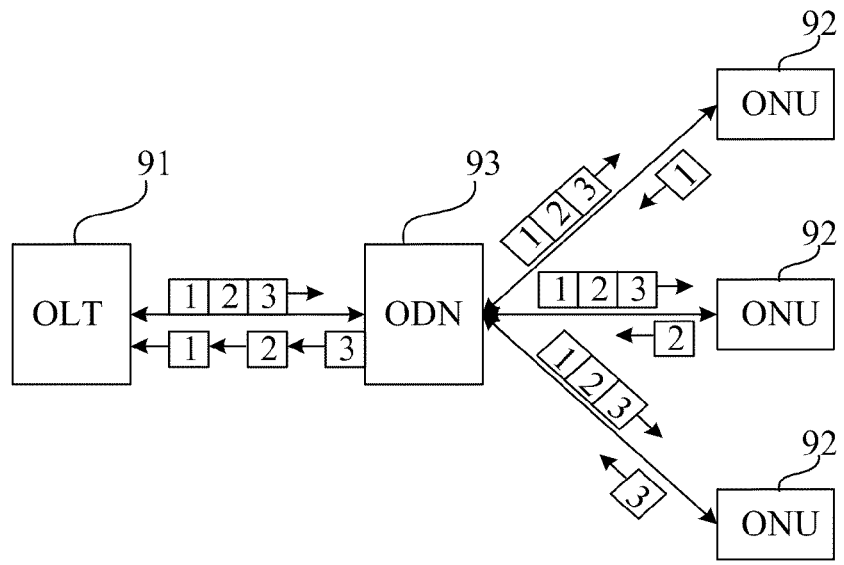
FIG. 1 is a topological view of a PON in the conventional art.
Figure 2:
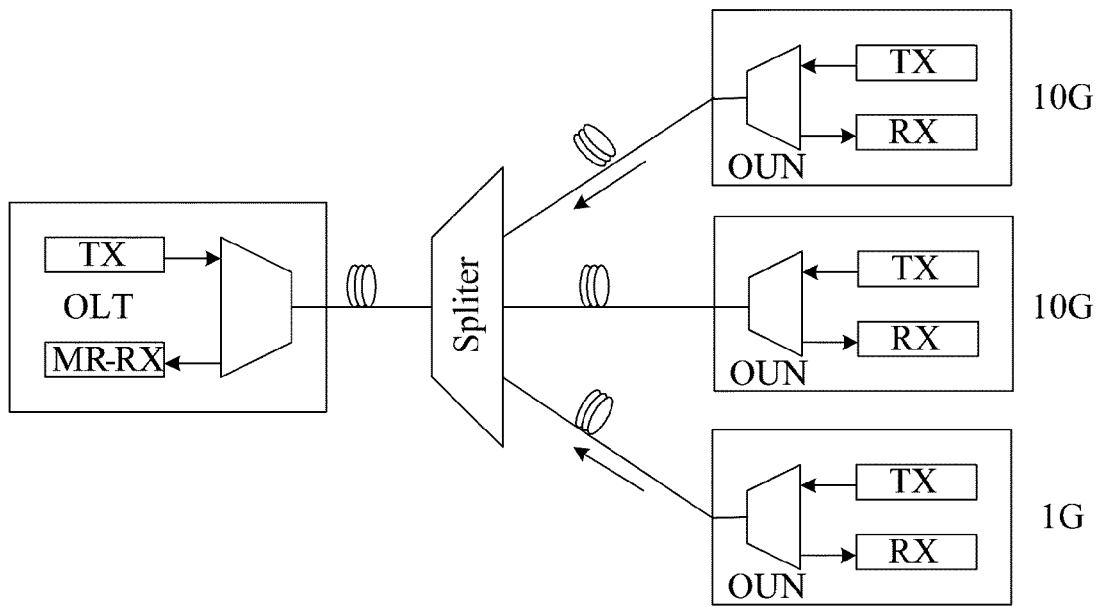
FIG. 2 is a schematic view of a 10G/1G EPON coexistence system in the conventional art.
Figure 3:
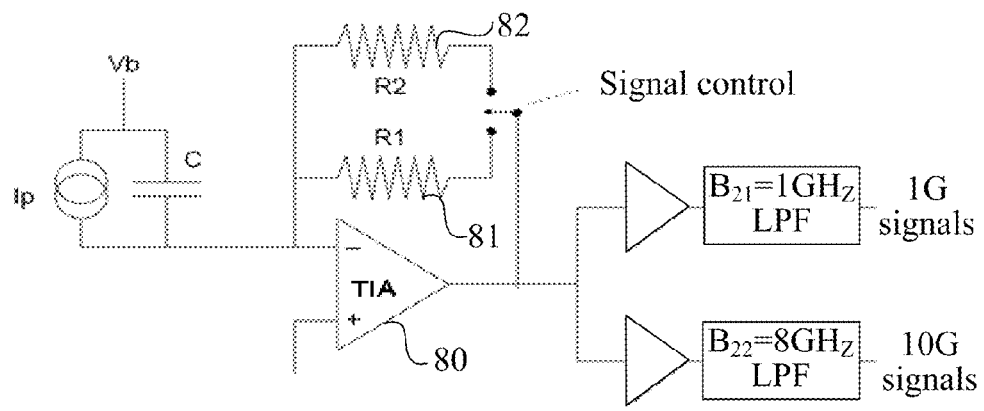
FIG. 3 is a schematic structural view of a receiving apparatus in the conventional art.
Figure 4:
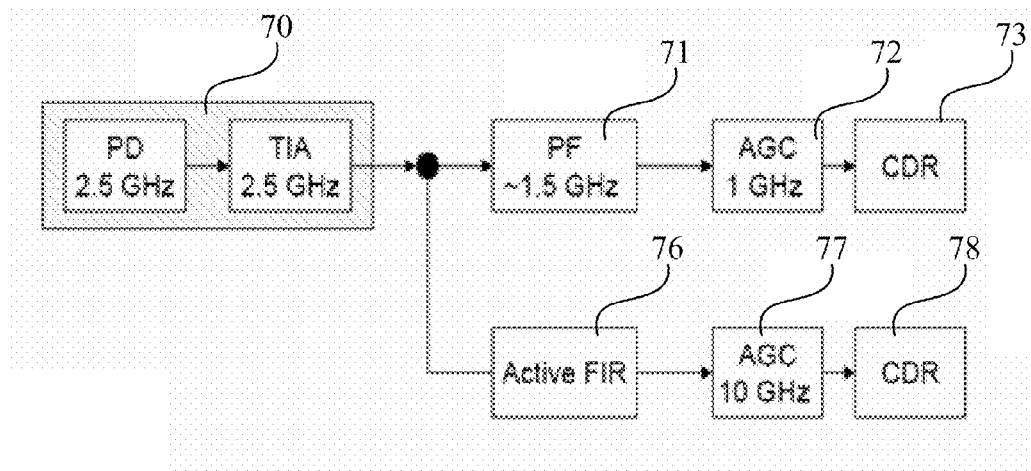
FIG. 4 is a schematic structural view of another receiving apparatus in the conventional art.
Figure 5:
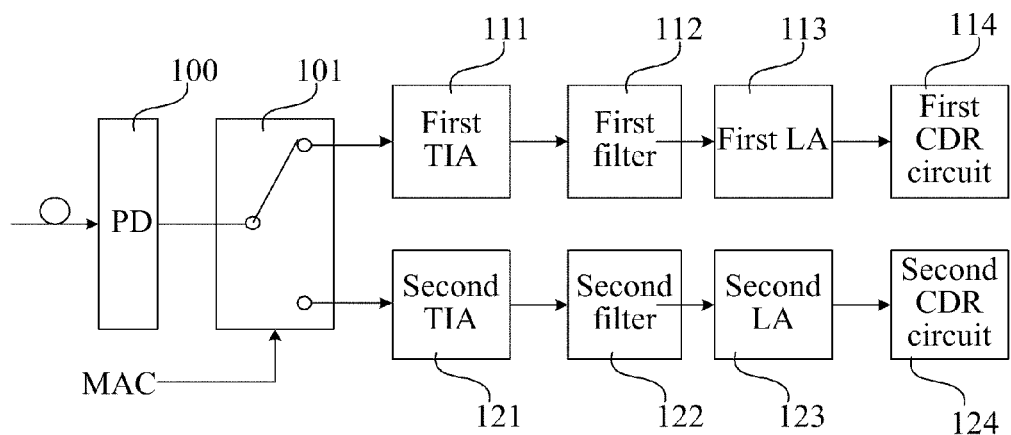
FIG. 5 is a schematic structural view of a receiving apparatus according to a first embodiment of the present invention.

FIG. 5 is a schematic structural view of the receiving apparatus according to the first embodiment of the present invention. Referring to FIG. 5, the receiving apparatus includes a PD 100, adapted to generate high-rate or low-rate current signals according to optical signals projected on the PD 100 and digitally modulated at a high or low rate; a first switch 101, adapted to switch to output the high-rate or low-rate current signals; a first TIA 111, adapted to amplify the received high-rate current signals into high-rate voltage signals; a first filter 112, adapted to filter out noises of the high-rate voltage signals and reduce a noise bandwidth; a first limiting amplifier (LA) 113, adapted to perform a limiting amplification on the filtered high-rate voltage signals; a first CDR circuit 114, adapted to extract clocks from the limited high-rate voltage signals and recover data signals; a second TIA 121, adapted to amplify the received low-rate current signals into low-rate voltage signals; a second filter 122, adapted to filter out noises of the low-rate voltage signals and reduce a noise bandwidth; a second LA 123, adapted to perform a limiting amplification on the filtered low-rate voltage signals; and a second CDR circuit 124, adapted to extract clocks from the limited low-rate voltage signals and recover data signals.

The PD may be a common positive-intrinsic-negative (PIN) photodiode, and under a reversed bias voltage, a current generated by the PIN photodiode forms a certain proportional relationship with an optical power projected thereon. The PD may also be an avalanche photodetector (APD), and the APD multiplies generated current signals by using an avalanche multiplication effect, thereby achieving a sensitivity higher than the sensitivity of the common PIN photodiode. Because it is difficult for the TIA to realize abrupt high frequency suppression, a filter is added after each TIA to filter out high frequency noises of the signals and reduce a noise bandwidth, thereby improving a signal-to-noise ratio of the output voltage signals. Moreover, because distances vary between an OLT and different ONUs, powers of the optical signals received by the PD are quite different. It is assumed that intensities of the received optical signals are between a sensitivity of −24 dBm and an upper limit power of −8 dBm with a dynamic range of 16 dB, that is, a difference of 40 times exists, and intensities of the current signals generated by the APD form a linear relationship with the optical powers, so that voltage amplitudes of the voltage signals output from the TIA also have a difference of 40 times. Therefore, an LA is adopted to amplify the signals output from the TIA to a fixed amplitude, and send the amplified signals to a CDR circuit thereafter. The CDR circuit recovers clocks and data signals from the received serial data, and sends the recovered clocks and data signals to a back-end for subsequent processing.

Because high-rate 10G optical signals and low-rate 1G optical signals projected on the PD 100 are transmitted in TDM mode, the two types of optical signals occupy different uplink time slots. The uplink transmission is distributed via a media access control (MAC) layer through downlink grant, and thus the MAC layer knows when the 10G signals or the 1G signals are received. When the 10G signals are received, the MAC layer controls the switching of the first switch 101 to connect the PD 100 and the first TIA 111, so as to convert the 10G optical signals into corresponding voltage signals for being output. Next, the first filter 112 filters out noises of the signals, and the first LA 113 amplifies the signals to a stable amplitude. Finally, the first CDR circuit 114 recovers 10G clocks and data for a back-end circuit to process. Similarly, when the 1G signals are received, the MAC layer controls the switching of the first switch 101 to connect the PD 100 and the second TIA 121, so as to convert the 1G optical signals into corresponding voltage signals for being output. Next, the second filter 122 filters out noises of the signals and the second LA 123 amplifies the signals to a stable amplitude. Finally, the second CDR circuit 124 recovers 1G clocks and data for a back-end circuit to process. During ranging, an adaptive process is adopted, that is, all uplink signals are 1G by default, the rate is switched to 10G when a failure occurs in a certain time window, and if a failure occurs again, the ranging fails.

In the receiving apparatus of this embodiment, high-rate 10G and low-rate 1G receiving paths are completely separated. This provides signals with good quality and avoids signal deterioration; and high-speed switching of the first switch between the high-rate 10G and low-rate 1G receiving paths under the control of the MAC simplifies the structure and lowers costs.

A Second Embodiment of the Receiving Apparatus

Figure 6:
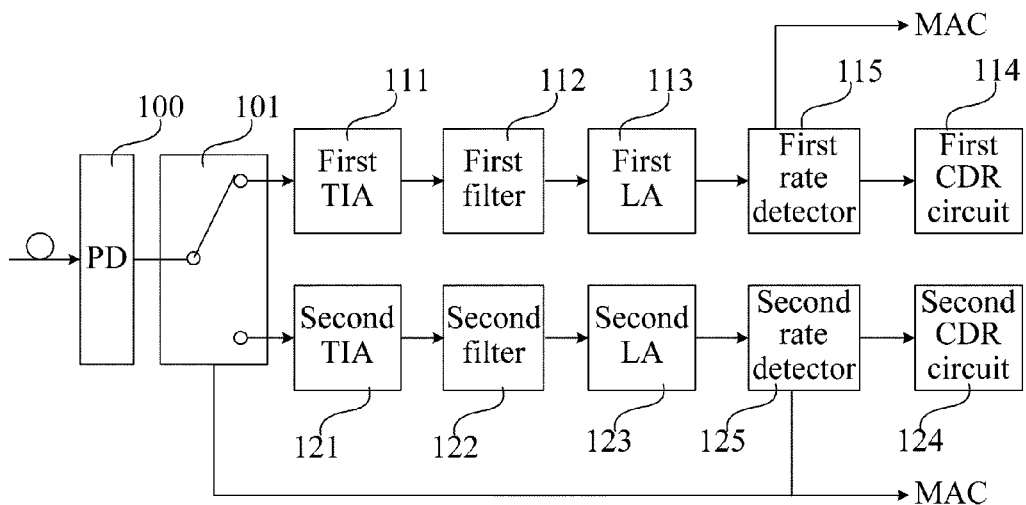
FIG. 6 is a schematic structural view of a receiving apparatus according to a second embodiment of the present invention.

FIG. 6 is a schematic structural view of the receiving apparatus according to the second embodiment of the present invention. Referring to FIG. 6, the receiving apparatus includes a PD 100, adapted to generate high-rate or low-rate current signals according to optical signals projected on the PD 100 and digitally modulated at a high or low rate; a first switch 101, adapted to switch to output the high-rate or low-rate current signals; a first TIA 111, adapted to amplify the received high-rate current signals into high-rate voltage signals; a first filter 112, adapted to filter out noises of the high-rate voltage signals and reduce a noise bandwidth; a first LA 113, adapted to perform a limiting amplification on the filtered high-rate voltage signals; a first rate detector 115, adapted to detect the voltage signals after the limiting amplification, and control the first switch 101 to connect to a second TIA 121 if the voltage signals are the low-rate voltage signals; a first CDR circuit 114, adapted to extract clocks from the high-rate voltage signals passing through the first rate detector 115 and recover data signals; a second TIA 121, adapted to amplify the received low-rate current signals into low-rate voltage signals; a second filter 122, adapted to filter out noises of the low-rate voltage signals and reduce a noise bandwidth; a second LA 123, adapted to perform a limiting amplification on the filtered low-rate voltage signals; a second rate detector 125, adapted to detect the voltage signals after the limiting amplification, and control the first switch 101 to connect to the first TIA 111 if the voltage signals are the high-rate voltage signals; and a second CDR circuit 124, adapted to extract clocks from the low-rate voltage signals passing through the second rate detector 125 and recover data signals.

The PD may be a common PIN photodiode, and under a reversed bias voltage, a current generated by the PIN photodiode forms a certain proportional relationship with an optical power projected thereon. The PD may also be an APD, and the APD multiplies generated current signals by using an avalanche multiplication effect, thereby achieving a sensitivity higher than the sensitivity of the common PIN photodiode. Because it is difficult for the TIA to realize abrupt high frequency suppression, a filter is added after each TIA to filter out high frequency noises of the signals and reduce a noise bandwidth, thereby improving a signal-to-noise ratio of the output voltage signals. Moreover, because distances vary between an OLT and different ONUs, powers of the optical signals received by the PD are quite different. Therefore, an LA is adopted to amplify the signals output from the TIA to a fixed amplitude. The first switch is controlled by the first rate detector and the second rate detector, and a part of the signals may be lost after the first switch completes switching and before the circuit reaches a stable state, which is determined by a response delay of the first switch. The response delay of the first switch refers to a delay between the moment that the signals are received and the moment that the first switch is turned on. The response delay of the first switch is equal to a sum of a TIA delay, a filter delay, an LA delay, a rate detecting delay, and a first switch delay, in which the first switch delay is a delay between the moment that a switch control signal is sent and the moment that the first switch is turned on. A subsequent CDR circuit extracts clocks from the received non-return-to-zero (NRZ) signals, and samples the received data signals with the extracted clocks, so as to recover the clocks and the data signals, and send the recovered clocks and data signals to a back-end for subsequent processing.

As high-rate 10G optical signals and low-rate 1G optical signals projected on the PD 100 are transmitted in TDM mode, the two types of optical signals occupy different uplink time slots. When the 10G signals are received, if the first switch 101 connects the PD 100 and the first TIA 111, the optical signals are converted into corresponding voltage signals for being output. Next, the first filter 112 filters out noises of the signals, and the first LA 113 amplifies the signals to a stable amplitude and sends the signals to the first rate detector 115 for being detected. After a certain determining time, for example, several bits, the first rate detector 115 determines that the signals are the 10G signals, and keeps controlling the first switch 101 to connect the PD 100 and the first TIA 111. The first CDR circuit 114 then recovers 10G clocks and data for a back-end circuit to process. If the first switch 101 connects the PD 100 and the second TIA 121, the optical signals are converted into corresponding voltage signals for being output. Next, the second filter 122 filters out noises of the signals, and the second LA 123 amplifies the signals and sends the signals to the second rate detector 125 for being detected. After a certain determining time, the second rate detector 125 determines that the signals are the 10G signals, and switches the first switch 101 to connect the PD 100 and the first TIA 111, so that the optical signals are converted into corresponding voltage signals for being output. Then, the first filter 112 filters out noises of the signals, and the first LA 113 amplifies the signals to a stable amplitude. The first rate detector 115 does not detect the rate any more, and the first CDR circuit 114 directly recovers 10G clocks and data for a back-end circuit to process.

Similarly, when the 1G signals are received, if the first switch 101 connects the PD 100 and the second TIA 121, the optical signals are converted into corresponding voltage signals for being output. Next, the second filter 122 filters out noises of the signals, and the second LA 123 amplifies the signals to a stable amplitude and sends the signals to the second rate detector 125 for being detected. After a certain determining time, for example, several bits, the second rate detector 125 determines that the signals are the 1G signals, and keeps controlling the first switch 101 to connect the PD 100 and the second TIA 121. The second CDR circuit 124 then recovers 1G clocks and data for a back-end circuit to process. If the first switch 101 connects the PD 100 and the first TIA 111, the optical signals are converted into corresponding voltage signals for being output. Next, the first filter 112 filters out noises of the signals, and the first LA 113 amplifies the signals and sends the signals to the first rate detector 115 for being detected. After a certain determining time, the first rate detector 115 determines that the signals are the 1G signals, and switches the first switch 101 to connect the PD 100 and the second TIA 121, so that the optical signals are converted into corresponding voltage signals for being output. Then, the second filter 122 filters out noises of the signals, and the second LA 123 amplifies the signals to a stable amplitude. The second rate detector 125 does not detect the rate any more, and the second CDR circuit 124 directly recovers 1G clocks and data for a back-end circuit to process.

When controlling the first switch to switch, the first rate detector and the second rate detector notify an MAC whether the uplink signals are the low-rate 1G signals or the high-rate 10G signals. Similarly, during ranging, an adaptive process is adopted, that is, all uplink signals are 1G by default, the rate is switched to 10G when a failure occurs in a certain time window, and if a failure occurs again, the ranging fails.

The first rate detector and the second rate detector only detect 0101 signals instead of signals with consecutive 0s or 1s. When the signals are received, a Gigabit Ethernet MAC (GMAC) notifies the rate detecting circuit to detect a preamble, and if the rate detector cannot detect the signals, the rate detector determines that the signals are not the signals of this path and switches the first switch to another path. Moreover, the first rate detector and the second rate detector may realize the determination within several bits.

In the receiving apparatus of this embodiment, high-rate 10G and low-rate 1G receiving paths are also completely separated. This provides signals with good quality and avoids signal deterioration; and high-speed automatic switching of the first switch between the high-rate 10G and low-rate 1G receiving paths under the control of the first rate detector and the second rate detector simplifies the structure and lowers costs.

A Third Embodiment of the Receiving Apparatus

Figure 7:
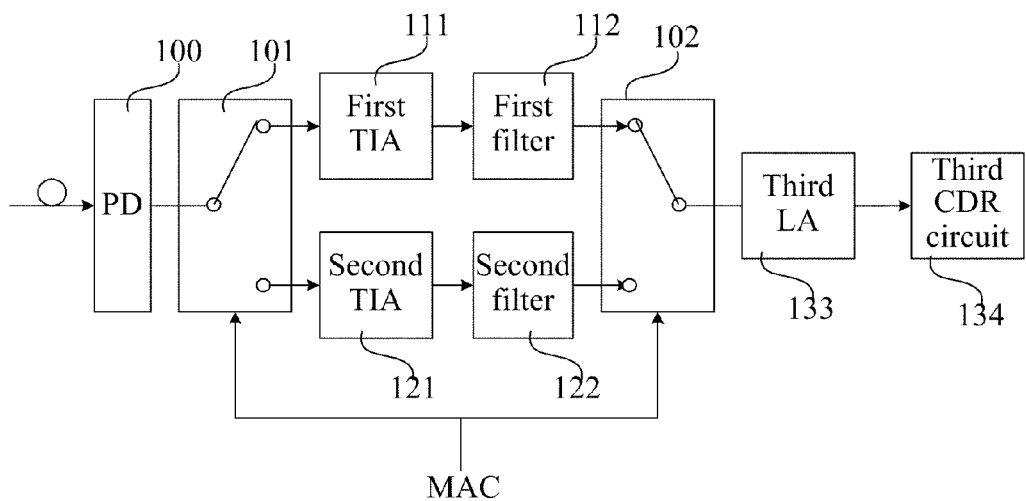
FIG. 7 is a schematic structural view of a receiving apparatus according to a third embodiment of the present invention.

FIG. 7 is a schematic structural view of the receiving apparatus according to the third embodiment of the present invention. Referring to FIG. 7, the receiving apparatus includes a PD 100, adapted to generate high-rate or low-rate current signals according to optical signals projected on the PD 100 and digitally modulated at a high or low rate; a first switch 101, adapted to switch to output the high-rate or low-rate current signals; a first TIA 111, adapted to amplify the received high-rate current signals into high-rate voltage signals; a first filter 112, adapted to filter out noises of the high-rate voltage signals and reduce a noise bandwidth; a second TIA 121, adapted to amplify the received low-rate current signals into low-rate voltage signals; a second filter 122, adapted to filter out noises of the low-rate voltage signals and reduce a noise bandwidth; a second switch 102, adapted to switch to output the filtered high-rate or low-rate voltage signals; a third LA 133, adapted to perform a limiting amplification on the filtered high-rate or low-rate voltage signals; and a third CDR circuit 134, adapted to extract clocks from the high-rate or low-rate voltage signals after the limiting amplification and recover data signals.

The PD may be a common PIN photodiode, and under a reversed bias voltage, a current generated by the PIN photodiode forms a certain proportional relationship with an optical power projected thereon. The PD may also be an APD, and the APD multiplies generated current signals by using an avalanche multiplication effect, thereby achieving a sensitivity higher than the sensitivity of the common PIN photodiode. Because it is difficult for the TIA to realize abrupt high frequency suppression, a filter is added after each TIA to filter out high frequency noises of the signals and reduce a noise bandwidth, thereby improving a signal-to-noise ratio of the output voltage signals. Moreover, because distances vary between an OLT and different ONUs, powers of the optical signals received by the PD are quite different. Therefore, an LA is adopted to amplify the signals output from the TIA to a fixed amplitude, so that a subsequent CDR circuit extracts clocks from the received NRZ signals, and samples the received data signals with the extracted clocks, so as to recover the clocks and the data signals, and send the recovered clocks and data signals to a back-end for subsequent processing. In this embodiment, the third LA and the third CDR circuit are designed in a dual mode, so as to be operated at the high rate 10G and the low rate 1G. The larger the signal bandwidth is, the greater the noises will be, and thus the bandwidth of the TIA and the bandwidth of the filter need to match with the rate of the signals, so as to suppress the high frequency noises and improve the sensitivity of the receiving apparatus without causing distortion in the signal transmission, so that the TIA and the filter are separately designed.

As high-rate 10G optical signals and low-rate 1G optical signals projected on the PD 100 are transmitted in TDM mode, the two types of optical signals occupy different uplink time slots. The uplink transmission is distributed via an MAC layer through downlink grant, and thus the MAC layer knows when the 10G signals or the 1G signals are received. When the 10G signals are received, the MAC layer controls the switching of the first switch 101 to connect the PD 100 and the first TIA 111, and switch the second switch 102 to connect the first filter 112 and the third LA 133. The first switch 101 connects the PD 100 and the first TIA 111, so as to convert the 10G optical signals into corresponding voltage signals for being output. Next, the first filter 112 filters out noises of the signals. The signals are then sent to the third LA 133 through the second switch 102 for being amplified to a stable amplitude. Finally, the third CDR circuit 134 recovers 10G clocks and data for a back-end circuit to process. Similarly, when the 1G signals are received, the MAC layer controls the switching of the first switch 101 to connect the PD 100 and the second TIA 121, and switch the second switch 102 to connect the second filter 122 and the third LA 133. The first switch 101 connects the PD 100 and the second TIA 121, so as to convert the 1G optical signals into corresponding voltage signals for being output. Next, the second filter 122 filters out noises of the signals. The signals are then sent to the third LA 133 through the second switch 102 for being amplified to a stable amplitude. Finally, the third CDR circuit 134 recovers 1G clocks and data for a back-end circuit to process. During ranging, an adaptive process is adopted, that is, all uplink signals are 1G by default, the rate is switched to 10G when a failure occurs in a certain time window, and if a failure occurs again, the ranging fails.

In the receiving apparatus of this embodiment, high-rate 10G and low-rate 1G receiving paths are basically separated. This provides signals with good quality and avoids signal deterioration; and high-speed switching of the first switch and the second switch between the high-rate 10G and low-rate 1G receiving paths under the control of the MAC simplifies the structure and lowers costs.

A Fourth Embodiment of the Receiving Apparatus

Figure 8:
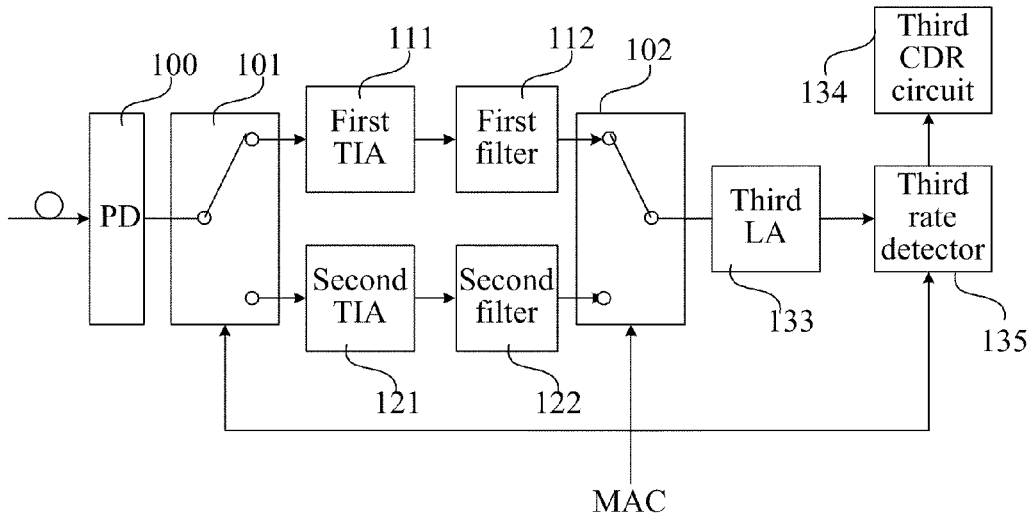
FIG. 8 is a schematic structural view of a receiving apparatus according to a fourth embodiment of the present invention.

FIG. 8 is a schematic structural view of the receiving apparatus according to the fourth embodiment of the present invention. Referring to FIG. 8, the receiving apparatus includes a PD 100, adapted to generate high-rate or low-rate current signals according to optical signals projected on the PD 100 and digitally modulated at a high or low rate; a first switch 101, adapted to switch to output the high-rate or low-rate current signals; a first TIA 111, adapted to amplify the received high-rate current signals into high-rate voltage signals; a first filter 112, adapted to filter out noises of the high-rate voltage signals and reduce a noise bandwidth; a second TIA 121, adapted to amplify the received low-rate current signals into low-rate voltage signals; a second filter 122, adapted to filter out noises of the low-rate voltage signals and reduce a noise bandwidth; a second switch 102, adapted to switch to output the filtered high-rate or low-rate voltage signals; a third LA 133, adapted to perform a limiting amplification on the filtered high-rate or low-rate voltage signals; a third rate detector 135, adapted to detect the voltage signals after the limiting amplification, control the first switch 101 to connect to the first TIA 111 and control the second switch 102 to connect to the first filter 112 if the voltage signals are the high-rate voltage signals, and control the first switch 101 to connect to the second TIA 121 and control the second switch 102 to connect to the second filter 122 if the voltage signals are the low-rate voltage signals; and a third CDR circuit 134, adapted to extract clocks from the high-rate or low-rate voltage signals passing through the rate detector and recover data signals.

The PD may be a common PIN photodiode, and under a reversed bias voltage, a current generated by the PIN photodiode forms a certain proportional relationship with an optical power projected thereon. The PD may also be an APD, and the APD multiplies generated current signals by using an avalanche multiplication effect, thereby achieving a sensitivity higher than the sensitivity of the common PIN photodiode. Because it is difficult for the TIA to realize abrupt high frequency suppression, a filter is added after each TIA to filter out high frequency noises of the signals and reduce a noise bandwidth, thereby improving a signal-to-noise ratio of the output voltage signals. Moreover, because distances vary between an OLT and different ONUs, powers of the optical signals received by the PD are quite different. Therefore, an LA is adopted to amplify the signals output from the TIA to a fixed amplitude, so that a subsequent CDR circuit extracts clocks from the received NRZ signals, and samples the received data signals with the extracted clocks, so as to recover the clocks and the data signals, and send the recovered clocks and data signals to a back-end for subsequent processing. In this embodiment, the third LA and the third CDR circuit are designed in a dual mode, so as to be operated at the high rate 10G and the low rate 1G. The larger the signal bandwidth is, the greater the noises will be, and thus the bandwidth of the TIA and the bandwidth of the filter need to match with the rate of the signals, so as to suppress the high frequency noises and improve the sensitivity of the receiving apparatus without causing distortion in the signal transmission, so that the TIA and the filter are separately designed.

As high-rate 10G optical signals and low-rate 1G optical signals projected on the PD 100 are transmitted in TDM mode, the two types of optical signals occupy different uplink time slots. When the 10G signals are received, if the first switch 101 connects the PD 100 and the first TIA 111, and the second switch 102 connects the first filter 112 and the third LA 133, the optical signals are converted into corresponding voltage signals for being output. Next, the first filter 112 filters out noises of the signals, and the third LA 133 amplifies the signals to a stable amplitude and sends the signals to the third rate detector 135 for being detected. After a certain determining time (for example, several bits), the third rate detector 135 determines that the signals are the 10G signals, and keeps controlling the first switch 101 to connect the PD 100 and the first TIA 111 and controlling the second switch 102 to connect the first filter 112 and the third LA 133. The third CDR circuit 134 then recovers 10G clocks and data for a back-end circuit to process. If the first switch 101 connects the PD 100 and the second TIA 121, and the second switch 102 connects the second filter 122 and the third LA 133, the optical signals are converted into corresponding voltage signals for being output. Next, the second filter 122 filters out noises of the signals, and the third LA 133 amplifies the signals and sends the signals to the third rate detector 135 for being detected. After a certain determining time, the third rate detector 135 determines that the signals are the 10G signals, and switches the first switch 101 to connect the PD 100 and the first TIA 111, so that the optical signals are converted by the PD 100 and the first TIA 111 into corresponding voltage signals for being output. Then, the first filter 112 filters out noises of the signals. The third rate detector 135 controls the switching of the second switch 102 to connect the first filter 112 and the third LA 133. The noise-filtered signals output from the first filter 112 are amplified by the third LA 133 to a stable amplitude. The third rate detector 135 does not detect the rate any more, and the third CDR circuit 134 directly recovers 10G clocks and data for a back-end circuit to process.

Similarly, when the 1G signals are received, if the first switch 101 connects the PD 100 and the second TIA 121, and the second switch 102 connects the second filter 122 and the third LA 133, the optical signals are converted into corresponding voltage signals for being output. Next, the second filter 122 filters out noises of the signals, and the third LA 133 amplifies the signals to a stable amplitude and sends the signals to the third rate detector 135 for being detected. After a certain determining time (for example, several bits), the third rate detector 135 determines that the signals are the 1G signals, and keeps controlling the first switch 101 to connect the PD 100 and the second TIA 121 and controlling the second switch 102 to connect the second filter 122 and the third LA 133. The third CDR circuit 134 then recovers 1G clocks and data for a back-end circuit to process. If the first switch 101 connects the PD 100 and the first TIA 111, and the second switch 102 connects the first filter 112 and the third LA 133, the optical signals are converted into corresponding voltage signals for being output. Next, the first filter 112 filters out noises of the signals, and the third LA 133 amplifies the signals and sends the signals to the third rate detector 135 for being detected. After a certain determining time, the third rate detector 135 determines that the signals are the 1G signals, and switches the first switch 101 to connect the PD 100 and the second TIA 121, so that the optical signals are converted by the PD 100 and the second TIA 121 into corresponding voltage signals for being output. Then, the second filter 122 filters out noises of the signals. The third rate detector 135 controls the switching of the second switch 102 to connect the second filter 122 and the third LA 133. The noise-filtered signals output from the second filter 122 are amplified by the third LA 133 to a stable amplitude. The third rate detector 135 does not detect the rate any more, and the third CDR circuit 134 directly recovers 1G clocks and data for a back-end circuit to process.

When controlling the first switch and the second switch to switch, the third rate detector notifies an MAC whether the uplink signals are the low-rate 1G signals or the high-rate 10G signals. Similarly, during ranging, an adaptive process is adopted, that is, all uplink signals are 1G by default, the rate is switched to 10G when a failure occurs in a certain time window, and if a failure occurs again, the ranging fails.

The third rate detector only detects 0101 signals instead of signals with consecutive 0s and 1s. When the signals are received, a GMAC notifies the rate detecting circuit to detect a preamble.

In the receiving apparatus of this embodiment, high-rate 10G and low-rate 1G receiving paths are also basically separated. This provides signals with good quality and avoids signal deterioration; and high-speed automatic switching of the first switch and the second switch between the high-rate 10G and low-rate 1G receiving paths under the control of the third rate detector simplifies the structure and lowers costs.

A receiving method of the present invention specifically includes the following steps.

In step 1, high-rate or low-rate current signals are generated according to optical signals projected and digitally modulated at a high or low rate.

In step 2, the high-rate or low-rate current signals are switched to output.

In step 3, the high-rate current signals are amplified into high-rate voltage signals, and the low-rate current signals are amplified into low-rate voltage signals.

A First Embodiment of the Receiving Method

Figure 9:
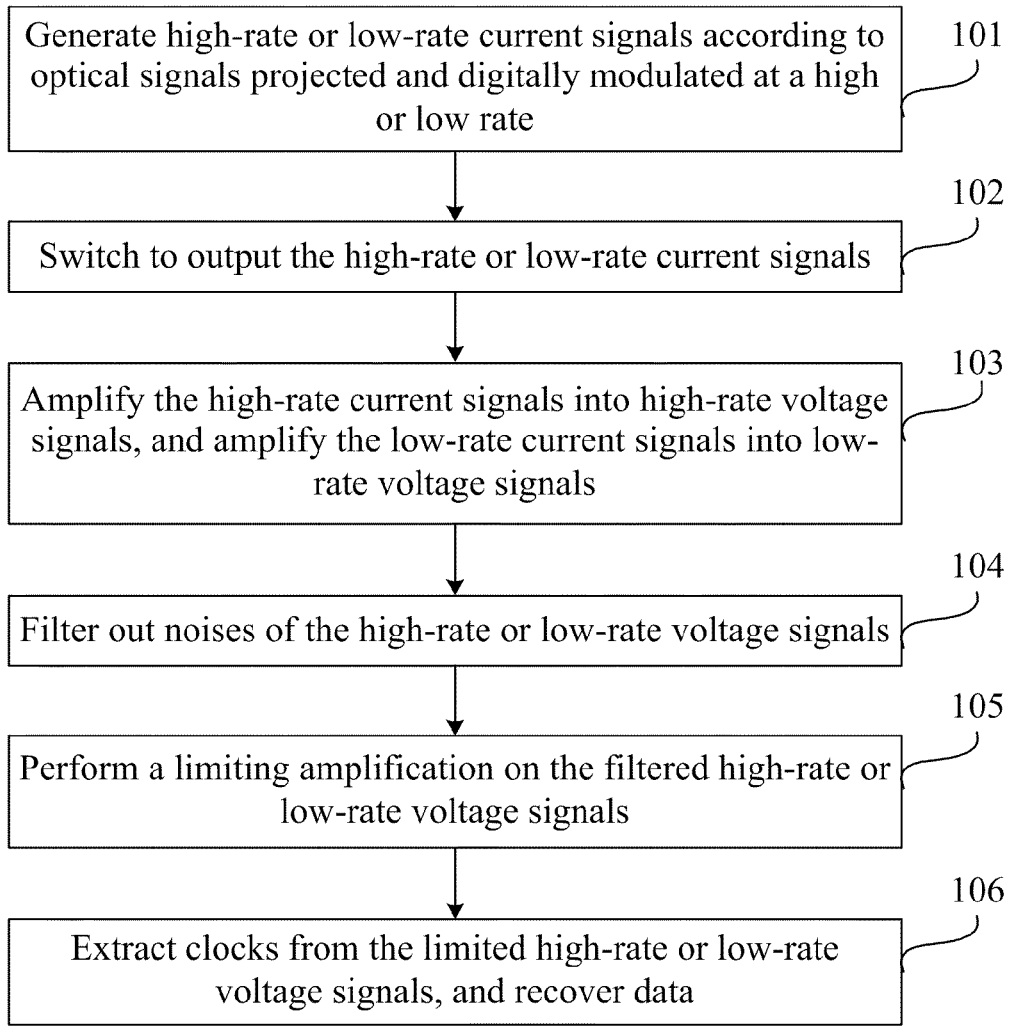
FIG. 9 is a flow chart of a receiving method according to a first embodiment of the present invention.

FIG. 9 is a flow chart of the receiving method according to the first embodiment of the present invention. Referring to FIG. 9, the method includes the following steps.

In step 101, high-rate or low-rate current signals are generated according to optical signals projected and digitally modulated at a high or low rate.

In step 102, the high-rate or low-rate current signals are switched to output.

A rate detecting circuit controls or an MAC layer controls the switching to output the high-rate or low-rate current signals.

In step 103, the high-rate current signals are amplified into high-rate voltage signals, and the low-rate current signals are amplified into low-rate voltage signals.

In step 104, noises of the high-rate or low-rate voltage signals are filtered out, and a noise bandwidth is reduced.

In step 105, a limiting amplification is performed on the filtered high-rate or low-rate voltage signals.

In step 106, clocks are extracted from the limited high-rate voltage signals, and data is recovered, or clocks are extracted from the limited low-rate voltage signals, and data is recovered.

In the receiving apparatus of this embodiment, high-rate 10G and low-rate 1G receiving paths are completely separated. This provides signals with good quality and avoids signal deterioration; and high-speed switching of the first switch between the high-rate 10G and low-rate 1G receiving paths under the control of the MAC simplifies the structure and lowers costs.

A Second Embodiment of the Receiving Method

Figure 10:
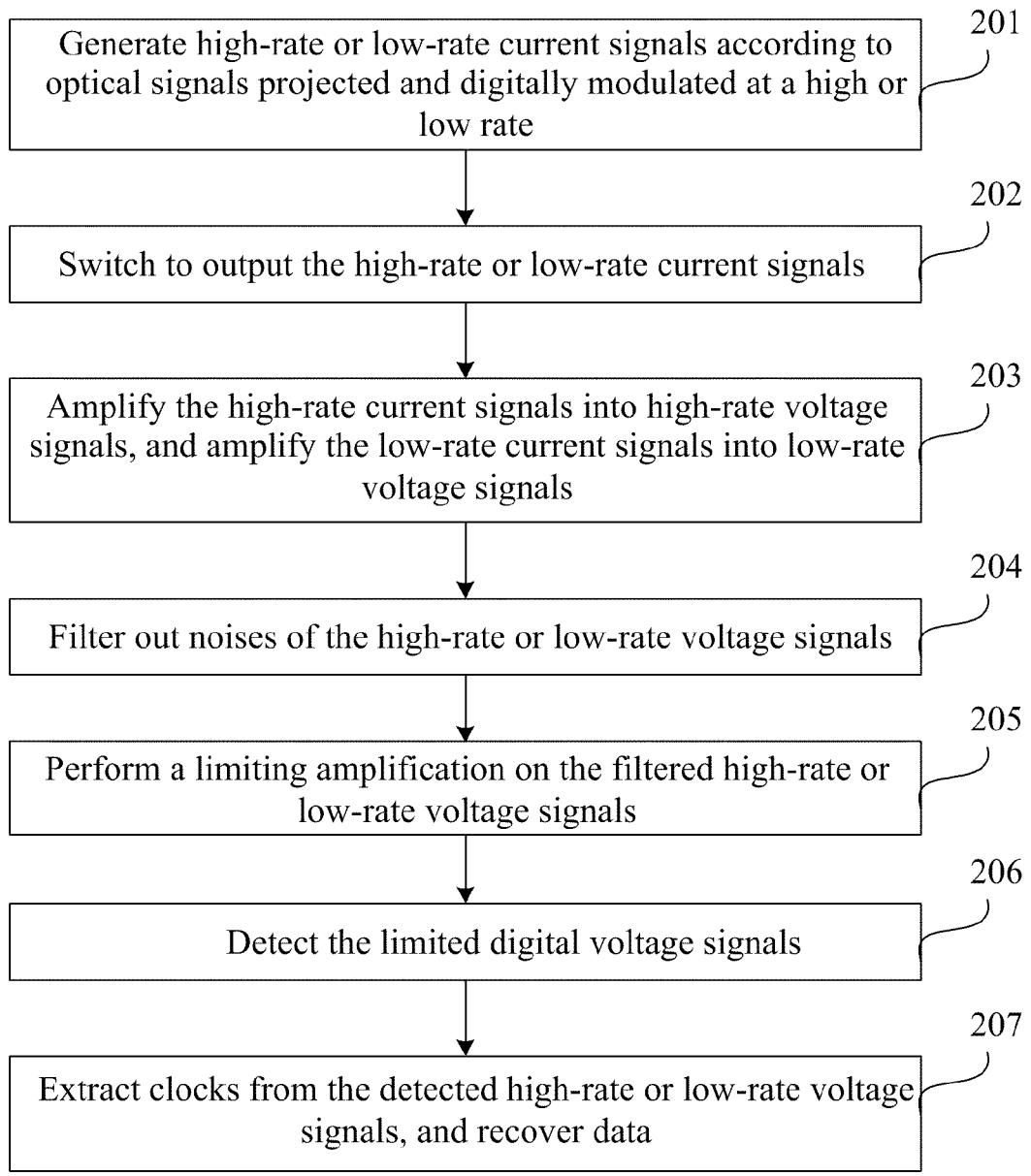
FIG. 10 is a flow chart of a receiving method according to a second embodiment of the present invention.

FIG. 10 is a flow chart of the receiving method according to the second embodiment of the present invention. Referring to FIG. 10, the method includes the following steps.

In step 201, high-rate or low-rate current signals are generated according to optical signals projected and digitally modulated at a high or low rate.

In step 202, the high-rate or low-rate current signals are switched to output.

In step 203, the high-rate current signals are amplified into high-rate voltage signals, and the low-rate current signals are amplified into low-rate voltage signals.

In step 204, noises of the high-rate or low-rate voltage signals are filtered out, and a noise bandwidth is reduced.

In step 205, a limiting amplification is performed on the filtered high-rate or low-rate voltage signals.

In step 206, the limited digital voltage signals are detected, the low-rate current signals are amplified into the low-rate voltage signals if the voltage signals are the low-rate voltage signals, and the high-rate current signals are amplified into the high-rate voltage signals if the voltage signals are the high-rate voltage signals.

In step 207, clocks are extracted from the detected high-rate or low-rate voltage signals, and data is recovered.

In the receiving apparatus of this embodiment, high-rate 10G and low-rate 1G receiving paths are also completely separated. This provides signals with good quality and avoids signal deterioration; and high-speed automatic switching of the first switch between the high-rate 10G and low-rate 1G receiving paths under the control of the first rate detector and the second rate detector simplifies the structure and lowers costs.

A Third Embodiment of the Receiving Method

Figure 11:
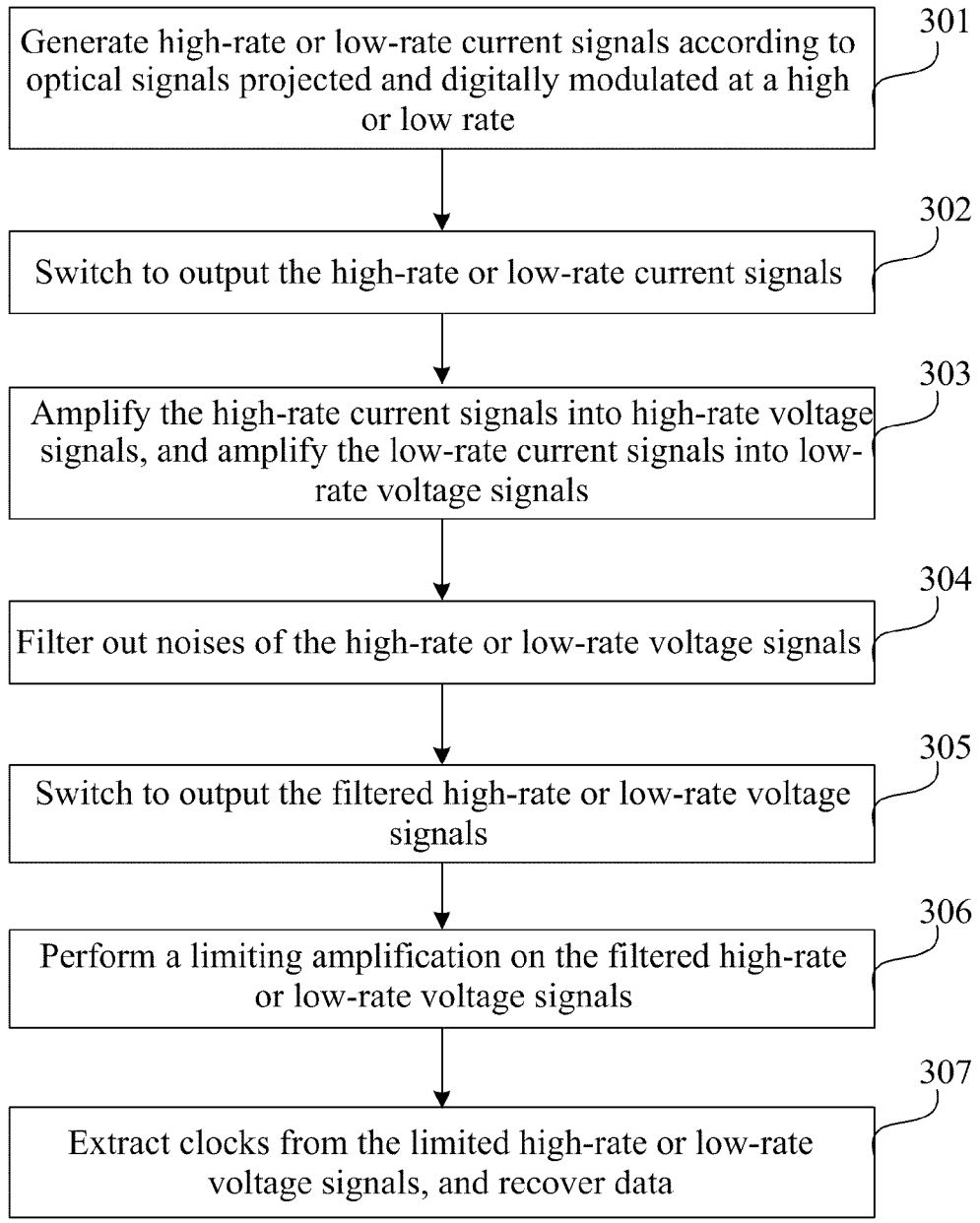
FIG. 11 is a flow chart of a receiving method according to a third embodiment of the present invention.

FIG. 11 is a flow chart of the receiving method according to the third embodiment of the present invention. Referring to FIG. 11, the method includes the following steps.

In step 301, high-rate or low-rate current signals are generated according to optical signals projected and digitally modulated at a high or low rate.

In step 302, the high-rate or low-rate current signals are switched to output.

A rate detecting circuit controls or an MAC layer controls the switching to output the high-rate or low-rate current signals.

In step 303, the high-rate current signals are amplified into high-rate voltage signals, and the low-rate current signals are amplified into low-rate voltage signals.

In step 304, noises of the high-rate or low-rate voltage signals are filtered out, and a noise bandwidth is reduced.

In step 305, the filtered high-rate or low-rate voltage signals are switched to output.

The rate detecting circuit controls or the MAC layer controls the switching to output the filtered high-rate or low-rate voltage signals.

In step 306, a limiting amplification is performed on the filtered high-rate or low-rate voltage signals.

In step 307, clocks are extracted from the limited high-rate or low-rate voltage signals, and data is recovered.

In the receiving apparatus of this embodiment, high-rate 10G and low-rate 1G receiving paths are basically separated. This provides signals with good quality and avoids signal deterioration; and high-speed switching of the first switch and the second switch between the high-rate 10G and low-rate 1G receiving paths under the control of the MAC simplifies the structure and lowers costs.

A Fourth Embodiment of the Receiving Method

Figure 12:
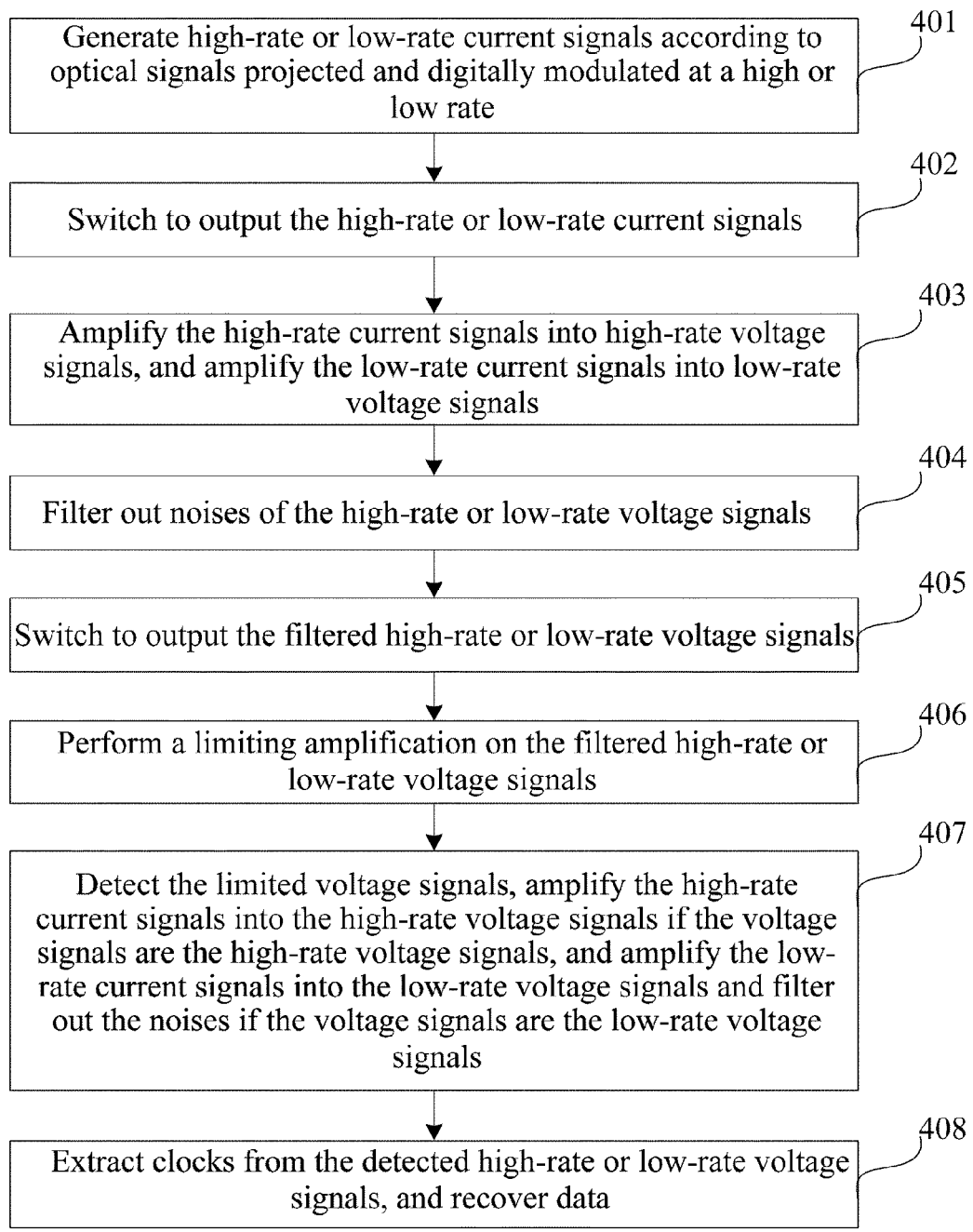
FIG. 12 is a flow chart of a receiving method according to a fourth embodiment of the present invention.

FIG. 12 is a flow chart of the receiving method according to the fourth embodiment of the present invention. Referring to FIG. 12, the method includes the following steps.

In step 401, high-rate or low-rate current signals are generated according to optical signals projected and digitally modulated at a high or low rate.

In step 402, the high-rate or low-rate current signals are switched to output.

In step 403, the high-rate current signals are amplified into high-rate voltage signals, and the low-rate current signals are amplified into low-rate voltage signals.

In step 404, noises of the high-rate or low-rate voltage signals are filtered out, and a noise bandwidth is reduced.

In step 405, the filtered high-rate or low-rate voltage signals are switched to output.

In step 406, a limiting amplification is performed on the filtered high-rate or low-rate voltage signals.

In step 407, the limited voltage signals are detected, the high-rate current signals are amplified into the high-rate voltage signals, the noises of the high-rate voltage signals are filtered out, and the noise bandwidth is reduced if the voltage signals are the high-rate voltage signals; and the low-rate current signals are amplified into the low-rate voltage signals, the noises of the low-rate voltage signals are filtered out, and the noise bandwidth is reduced if the voltage signals are the low-rate voltage signals.

In step 408, clocks are extracted from the detected high-rate or low-rate voltage signals, and data is recovered.

In the receiving apparatus of this embodiment, high-rate 10G and low-rate 1G receiving paths are also basically separated. This provides signals with good quality and avoids signal deterioration; and high-speed automatic switching of the first switch and the second switch between the high-rate 10G and low-rate 1G receiving paths under the control of the third rate detector simplifies the structure and lowers costs.

Finally, it should be noted that the above embodiments are provided for merely elaborating the technical solutions of the present invention, but not intended to limit the present invention. It should be understood by persons of ordinary skill in the art that although the present invention has been described in detail with reference to the foregoing embodiments, modifications or equivalent replacements can be made to the technical solutions without departing from the scope of the present invention.

What is claimed is:

1. A receiving apparatus, comprising:
a photoelectric detector (PD), configured to generate high-rate or low-rate current signals according to optical signals projected on the PD and digitally modulated at a high or low rate;
a first switch, connected to the PD, and configured to switch to output the high-rate or low-rate current signals, and output the high-rate current signals to a first transimpedance amplifier (TIA) or output the low-rate current signals to a second TIA;
the first TIA, configured to amplify the received high-rate current signals into high-rate voltage signals;
the second TIA, configured to amplify the received low-rate current signals into low-rate voltage signals;
a first filter, connected to the first TIA, and configured to filter out noises of the high-rate voltage signals and reduce a noise bandwidth;
a second filter, connected to the second TIA, and configured to filter out noises of the low-rate voltage signals and reduce a noise bandwidth;
a first limiting amplifier (LA), configured to perform a limiting amplification on the filtered high-rate voltage signals; and
a second LA, configured to perform a limiting amplification on the filtered low-rate voltage signals;
a first rate detector, disposed between the first LA and the first CDR circuit, and configured to detect the limited digital voltage signals, and control the first switch to connect to the second TIA if the voltage signals are the low-rate voltage signals; and
a second rate detector, disposed between the second LA and the second CDR circuit, and configured to detect the limited digital voltage signals, and control the first switch to connect to the first TIA if the voltage signals are the high-rate voltage signals.

2. The receiving apparatus according to claim 1, wherein the first switch is controlled by a media access control (MAC) layer to switch to output the high-rate or low-rate current signals.

3. The receiving apparatus according to claim 1, further comprising:
a first clock and data recovery (CDR) circuit, adapted to extract clocks from the limited high-rate voltage signals and recover data; and
a second CDR circuit, adapted to extract clocks from the limited low-rate voltage signals and recover data.

4. A passive optical network system, comprising:
a transmitting apparatus, configured to send optical signals to a receiving apparatus; and
a receiving apparatus, according to claim 3.

5. A passive optical network system, comprising:
a transmitting apparatus, configured to send optical signals to a receiving apparatus; and
a receiving apparatus, according to claim 1.

6. The receiving apparatus according to claim 1, further comprising:
a first CDR circuit, configured to extract clocks from the high-rate voltage signals passing through the first rate detector and recover data; and
a second CDR circuit, configured to extract clocks from the low-rate voltage signals passing through the second rate detector and recover data.

7. A passive optical network system, comprising:
a transmitting apparatus, configured to send optical signals to a receiving apparatus; and
a receiving apparatus, according to claim 6.

8. The receiving apparatus according to claim 1, further comprising:
a second switch, configured to switch to output the filtered high-rate or low-rate voltage signals.

9. A passive optical network system, comprising:
a transmitting apparatus, configured to send optical signals to a receiving apparatus; and
a receiving apparatus, according to claim 8.

10. The receiving apparatus according to claim 8, further comprising:
a third LA, disposed after the second switch, and configured to perform a limiting amplification on the filtered high-rate or low-rate voltage signals.

11. A passive optical network system, comprising:
a transmitting apparatus, configured to send optical signals to a receiving apparatus; and
a receiving apparatus, according to claim 10.

12. The receiving apparatus according to claim 8, wherein the first switch is controlled by an MAC layer to switch to output the high-rate or low-rate current signals, and the second switch is controlled by the MAC layer to switch to output the filtered high-rate or low-rate voltage signals.

13. A passive optical network system, comprising:
a transmitting apparatus, configured to send optical signals to a receiving apparatus; and
a receiving apparatus, according to claim 12.

14. The receiving apparatus according to claim 10, further comprising:
a third rate detector, configured to detect the limited voltage signals, control the first switch to connect to the first TIA and control the second switch to connect to the first filter if the voltage signals are the high-rate voltage signals, and control the first switch to connect to the second TIA and control the second switch to connect to the second filter if the voltage signals are the low-rate voltage signals.

15. A passive optical network system, comprising:
a transmitting apparatus, configured to send optical signals to a receiving apparatus; and
a receiving apparatus, according to claim 14.

16. A receiving method, comprising:
generating high-rate or low-rate current signals according to optical signals projected and digitally modulated at a high or low rate;
switching to output the high-rate or low-rate current signals; and
amplifying the high-rate current signals into high-rate voltage signals and amplifying the low-rate current signals into low-rate voltage signals;
filtering out noises of the high-rate or low-rate voltage signals and reducing a noise bandwidth;
performing a limiting amplification on the filtered high-rate or low-rate voltage signals;
detecting the limited digital voltage signals, amplifying the low-rate current signals into the low-rate voltage signals if the voltage signals are the low-rate voltage signals, and amplifying the high-rate current signals into the high-rate voltage signals if the voltage signals are the high-rate voltage signals; and extracting clocks from the detected high-rate or low-rate voltage signals, and recovering data.

17. The receiving method according to claim 16, further comprising:

filtering out noises of the high-rate or low rate voltage signals, and reducing a noise bandwidth;

switching to output the filtered high-rate voltage signals; and performing a limiting amplification on the filtered high-rate or low-rate voltage signals.

18. A passive optical network system, comprising:

a transmitting apparatus, configured to send optical signals to a receiving apparatus; and a receiving apparatus, according to claim 2.

* * * * *